(12) United States Patent
Mishra et al.

(10) Patent No.: US 10,983,552 B2
(45) Date of Patent: Apr. 20, 2021

(54) LOW LATENCY TRIGGER ACTIVATION MECHANISM USING BUS PROTOCOL ENHANCEMENT

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 16/507,904

(22) Filed: Jul. 10, 2019

(65) Prior Publication Data

US 2020/0033908 A1 Jan. 30, 2020

Related U.S. Application Data

(60) Provisional application No. 62/703,140, filed on Jul. 25, 2018.

(51) Int. Cl.
*G06F 1/10* (2006.01)
*G06F 13/42* (2006.01)
*G06F 13/362* (2006.01)

(52) U.S. Cl.
CPC .............. *G06F 1/10* (2013.01); *G06F 13/362* (2013.01); *G06F 13/4291* (2013.01)

(58) Field of Classification Search
CPC ....... G06F 1/10; G06F 13/362; G06F 13/4291
See application file for complete search history.

(56) References Cited

U.S. PATENT DOCUMENTS

| | | | |
|---|---|---|---|
| 2003/0156552 A1* | 8/2003 | Banker | H04L 41/046 370/266 |
| 2011/0007666 A1* | 1/2011 | Gurdan | H04L 12/4637 370/254 |
| 2014/0281082 A1* | 9/2014 | Bagger | G06F 1/26 710/110 |
| 2016/0048470 A1* | 2/2016 | Zhang | G06F 13/24 710/110 |
| 2016/0105320 A1* | 4/2016 | Osterberg | H04L 41/0853 709/208 |
| 2017/0118125 A1* | 4/2017 | Mishra | H04L 45/74 |

(Continued)

*Primary Examiner* — Glenn A. Auve

(57) ABSTRACT

Systems, methods, and apparatus for improving bus latency are described. Clock-cycle overhead associated with the transmission of trigger activation information may be reduced through the use of optimized datagram structures for register-configurable trigger activation mechanisms. A first mechanism defines a command code with a first Trigger-Activation datagram, and a second mechanism defines a command code with a second Trigger-Activation datagram that uses a 4-bit Magic-ID and eliminates 18 clock cycles from the conventional Extended Register Write datagram structure. A method performed at a device coupled to a serial bus includes generating a datagram that does not have an address field, populating a data payload of the datagram with trigger activation information directed to a plurality of slave devices coupled to a serial bus, and transmitting the datagram over the serial bus. Transmission of the datagram serves as a trigger that causes a configuration change in at least one slave device.

25 Claims, 13 Drawing Sheets

(56) References Cited

U.S. PATENT DOCUMENTS

2017/0168966 A1* 6/2017 Mishra ................ G06F 13/4022
2017/0223646 A1* 8/2017 Romera ............ H04W 52/0235
2018/0113834 A1* 4/2018 O'Shea ............... G06F 13/4282
2019/0363906 A1* 11/2019 Bunte ................ H04L 12/4015

* cited by examiner

Legacy Trigger Activation Transmission

| SSC | Device ID | Command Code | P | Address | P | Nx Trigger Activation Bytes | BP |
|---|---|---|---|---|---|---|---|
| 2 cycles | 4 cycles | 9 cycles (including 1 bit parity) | | 9 cycles (including 1 bit parity) | | Nx9 cycles (including parity) | 1 cycle |

Total Clock Cycles = 25 + (N x 9)

First Low-Latency Trigger Activation Transmission

| SSC | Device ID | LLTA-Command Code | P | Nx Trigger Activation Bytes | BP |
|---|---|---|---|---|---|
| 2 cycles | 4 cycles | 9 cycles (including 1 bit parity) | | Nx9 cycles (including parity) | 1 cycle |

Total Clock Cycles = 16 + (N x 9)

*FIG. 8*

Legacy Trigger Activation Transmission

| SSC | Device ID | Command Code | P | Address | P | Nx Trigger Activation Bytes | BP |
|---|---|---|---|---|---|---|---|
| 2 cycles | 4 cycles | 9 cycles (including 1 bit parity) | | 9 cycles (including 1 bit parity) | | Nx9 cycles (including parity) | 1 cycle |

902 — SSC; 904 — Device ID; 906 — Command Code; 908 — Address; 910 — Nx Trigger Activation Bytes; 912 — BP Total Clock Cycles = 25 + (N x 9)

900

Second Low-Latency Trigger Activation Transmission

| SSC | Magic-ID | Nx Trigger Activation Bytes | BP |
|---|---|---|---|
| 2 cycles | 4 cycles | Nx9 cycles (including parity) | 1 cycle |

922 — SSC; 924 — Magic-ID; 926 — Nx Trigger Activation Bytes; 928 — BP

Total Clock Cycles = 7 + (N x 9)

LOW LATENCY TRIGGER ACTIVATION MECHANISM USING BUS PROTOCOL ENHANCEMENT

PRIORITY CLAIM

This application claims priority to and the benefit of U.S. Provisional Patent Application Ser. No. 62/703,140 filed in the U.S. Patent Office on Jul. 25, 2018, the entire content of this application being incorporated herein by reference as if fully set forth below in its entirety and for all applicable purposes.

TECHNICAL FIELD

The present disclosure relates generally to serial communication over a shared serial bus and, more particularly, to optimizing latencies associated with time-critical data transmitted over the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the system power management interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. The RFFE interface defines a communication interface that can be used for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. The SPMI provides a hardware interface that may be implemented between baseband or application processors and peripheral components. In some instances, the SPMI is deployed to support power management operations within a device.

A multi-drop serial bus may be implemented using one or more interface protocols to support high-priority, low-latency communication between an application processor and certain peripherals, and other lower-priority communication. Latency can be adversely affected when multiple devices coupled to the serial bus are concurrently active. Degraded latencies can lead to an increase in dropped packets, session timeouts and retransmissions on the serial bus. As mobile communication devices continue to include a greater level of functionality, improved serial communication techniques are needed to improve latencies and/or improve handling of priority traffic on a serial bus that couples peripherals and application processors.

SUMMARY

Certain aspects of the disclosure relate to systems, apparatus, methods and techniques that can support increased data rates for a serial bus without increasing bus clock frequency and without modifying encoding of the data transmitted on the data line.

In various aspects of the disclosure, a method performed at a device coupled to a serial bus includes generating a datagram that does not have an address field, populating a data payload of the datagram with trigger activation information directed to a plurality of slave devices coupled to a serial bus, and transmitting the datagram over the serial bus. Transmission of the datagram serves as a trigger that causes a configuration change in at least one slave device.

In certain aspects, the method includes providing a command field in the datagram with a trigger activation command code selected to cause the plurality of slave devices to respond to the datagram by writing trigger activation data to a register address associated with the trigger activation command code. The method may include writing the trigger activation command code to a configuration register in each of the plurality of slave devices before transmitting the datagram over the serial bus. The trigger activation information may be directed to one or more trigger elements in the plurality of slave devices. The trigger elements may include a phase-shifting circuit coupled to an antenna. The method may include selecting the trigger activation information to configure a mask or gating logic that enables reconfiguration of the one or more trigger elements responsive to the trigger activation information.

In some aspects, the method includes populating an address field of the datagram with a trigger activation device identifier that identifies the datagram as a trigger activation datagram. The datagram may be generated without a command field. The method may include writing the trigger activation device identifier to a configuration register in each of the plurality of slave devices before transmitting the datagram over the serial bus. The trigger activation device identifier may be selected to cause the plurality of slave devices to respond to the datagram by writing trigger activation data to a register address associated with the trigger activation device identifier. The datagram may be transmitted over the serial bus in accordance with an RFFE protocol.

In various aspects of the disclosure, an apparatus includes an interface circuit adapted to couple the slave device to a first serial bus and a processor. The processor may be configured to generate a datagram that does not have an address field, populate a data payload of the datagram with trigger activation information directed to a plurality of slave devices coupled to a serial bus, and transmit the datagram over the serial bus. Transmission of the datagram may serve as a trigger that causes a configuration change in at least one slave device.

In various aspects of the disclosure, a processor-readable storage medium includes code for generating a datagram that does not have an address field, populating a data payload of the datagram with trigger activation information directed to a plurality of slave devices coupled to a serial bus, and transmitting the datagram over the serial bus. Transmission of the datagram may serve as a trigger that causes a configuration change in at least one slave device.

In various aspects of the disclosure, an apparatus includes means for generating a datagram that does not have an address field. A data payload of the datagram may be populated with trigger activation information directed to a plurality of slave devices coupled to a serial bus. The apparatus may include means for transmitting the datagram over the serial bus. Transmission of the datagram may serve as a trigger that causes a configuration change in at least one slave device.

BRIEF DESCRIPTION OF THE DRAWINGS

FIG. 8 illustrates a first low-latency datagram structure that may be used to carry a low-latency Trigger-Activation command in accordance with certain aspects disclosed herein.

FIG. 9 illustrates a second low-latency datagram structure that may be used to carry a low-latency Trigger-Activation command in accordance with certain aspects disclosed herein.

DETAILED DESCRIPTION

Figure 1:
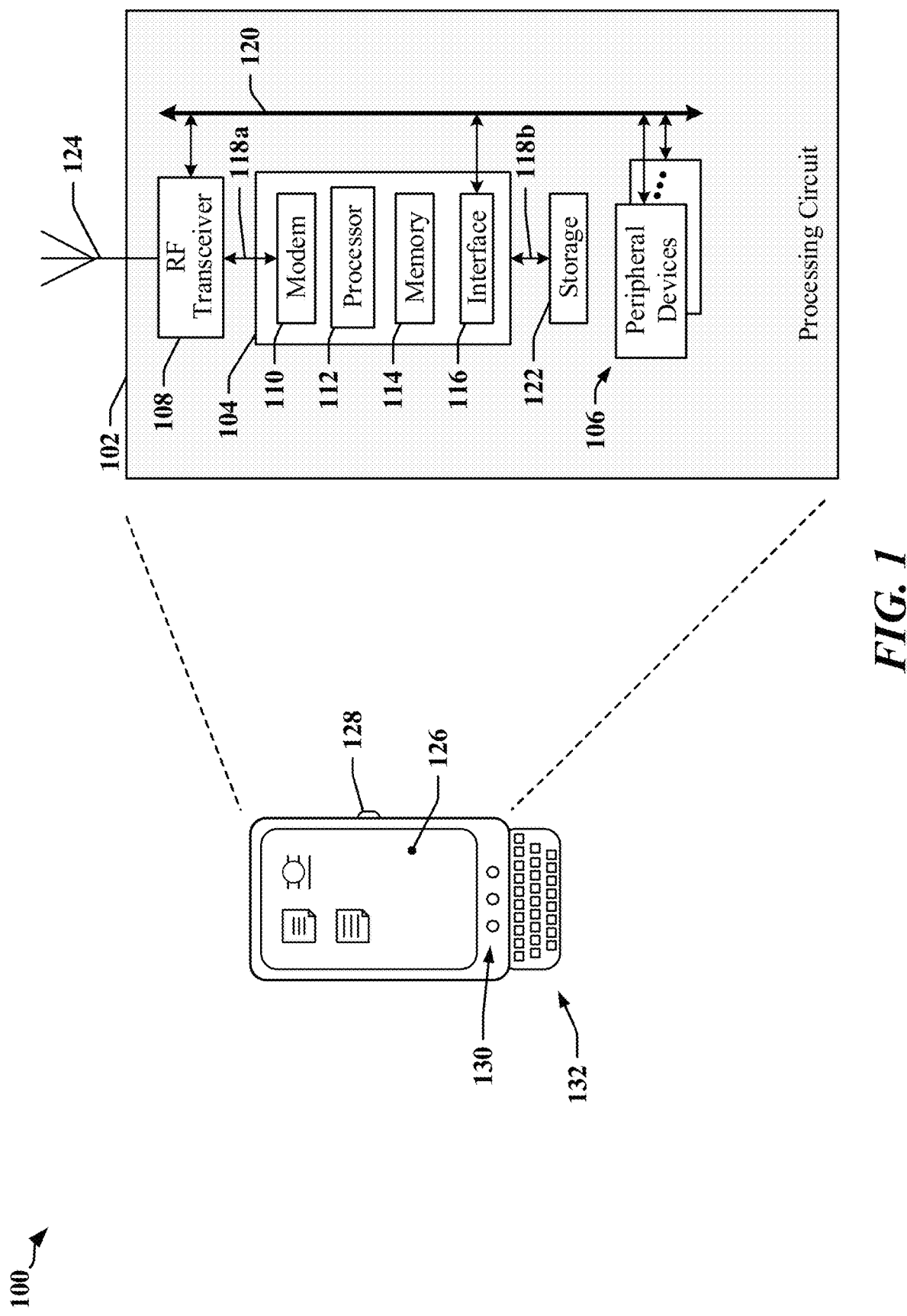
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or another protocol that may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

High bus latency can limit the capabilities and functionality of a serial bus in certain applications. For example, bus latency considerations may limit the number of radio frequency (RF) devices that can be coupled by an I3C, RFFE or SPMI bus. In some examples, multiple serial buses may be implemented to enable RF or other low-latency devices to communicate within tight time constraints, including where bus throughput, utilization and/or other operating characteristics are otherwise easily supported by a single bus.

Certain operations performed using a radio frequency IC require very low-latency communication between devices. For example, configuration and reconfiguration of circuits used to drive multiple antennas may generate large volumes of messages, commands and signaling directed to multiple radio frequency components. In many instances, the messages may include configuration parameters that are to be applied at a time determined by a controlling device. In some instances, triggers may be sent to activate a configuration. Triggers sent to initiate a sequence of configurations or actions according to timeline in a radio frequency device must typically be communicated with very low latency.

Certain aspects disclosed herein reduce the clock-cycle overhead associated with the transmission of trigger activation information. In one example, clock-cycle overhead includes the clock cycles used to transmit the fields of an RFFE datagram that do not carry payload data. Clock-cycle overhead may be reduced through the use of optimized datagram structures for register-configurable trigger activation mechanisms. A first mechanism defines a command code with a first Trigger-Activation datagram, and a second mechanism defines a command code with a second Trigger-Activation datagram that uses a 4-bit Magic-ID and eliminates 18 clock cycles from the conventional Extended Register Write datagram structure.

Certain aspects disclosed herein may be applicable to a serial bus operated in accordance with an I2C, I3C, SPMI, and/or RFFE protocol, or other protocol. Certain aspects are applicable to a serial bus operated in either half-duplex mode or full-duplex mode. Certain aspects are applicable to point-to-point interfaces, including Universal Asynchronous Receiver/Transmitter (UART) interfaces, line multiplexed UART (LM-UART) interfaces, and/or virtual GPIO (VGI) messaging interfaces. Certain aspects are applicable to multipoint interfaces and/or interfaces operated in point-to-point mode.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
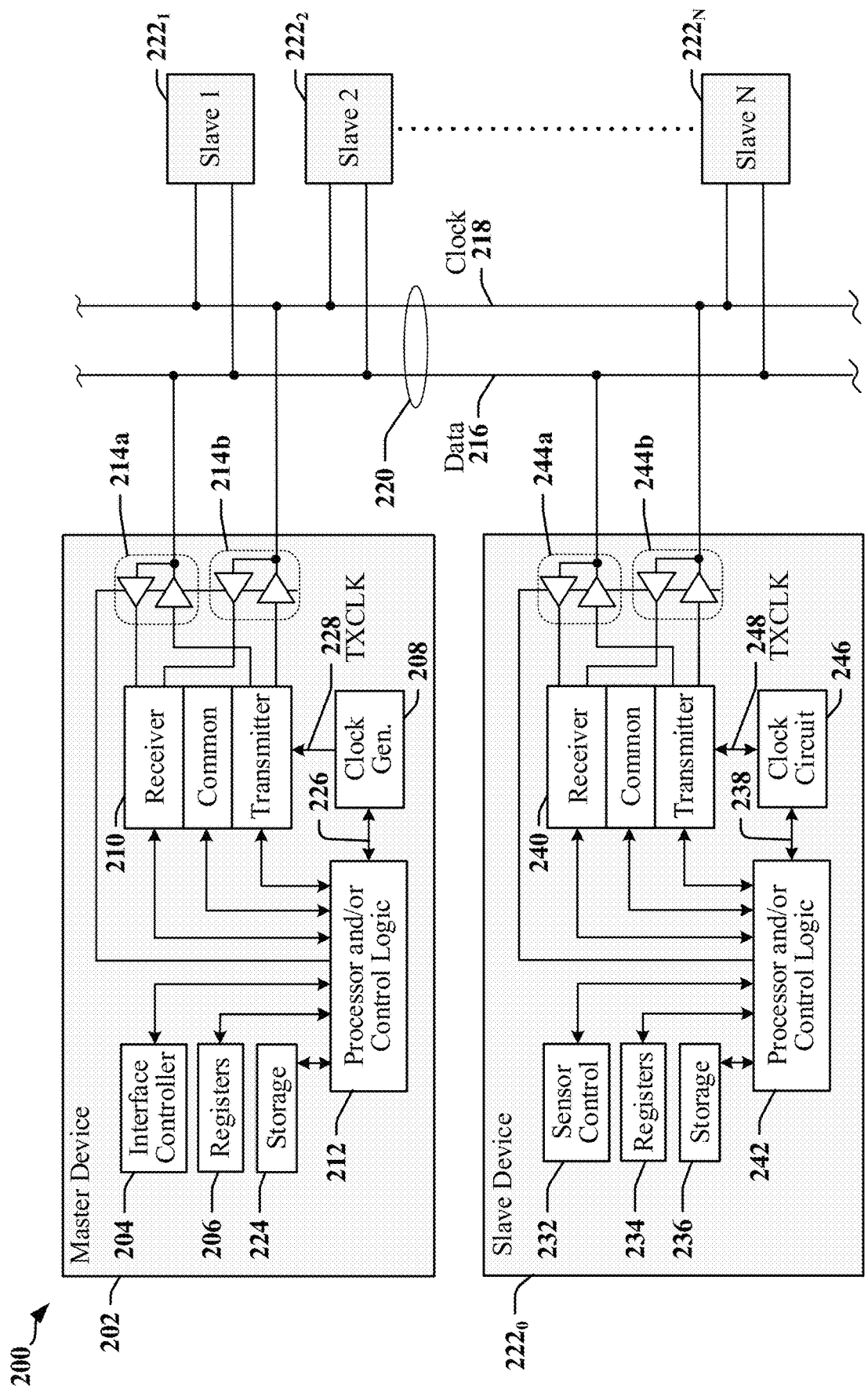
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218.

Other timing clocks 238 may be used by the control logic 242 and other functions, circuits or modules.

The serial bus 220 may be operated in accordance with I2C, I3C, RFFE, SPMI, or another protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
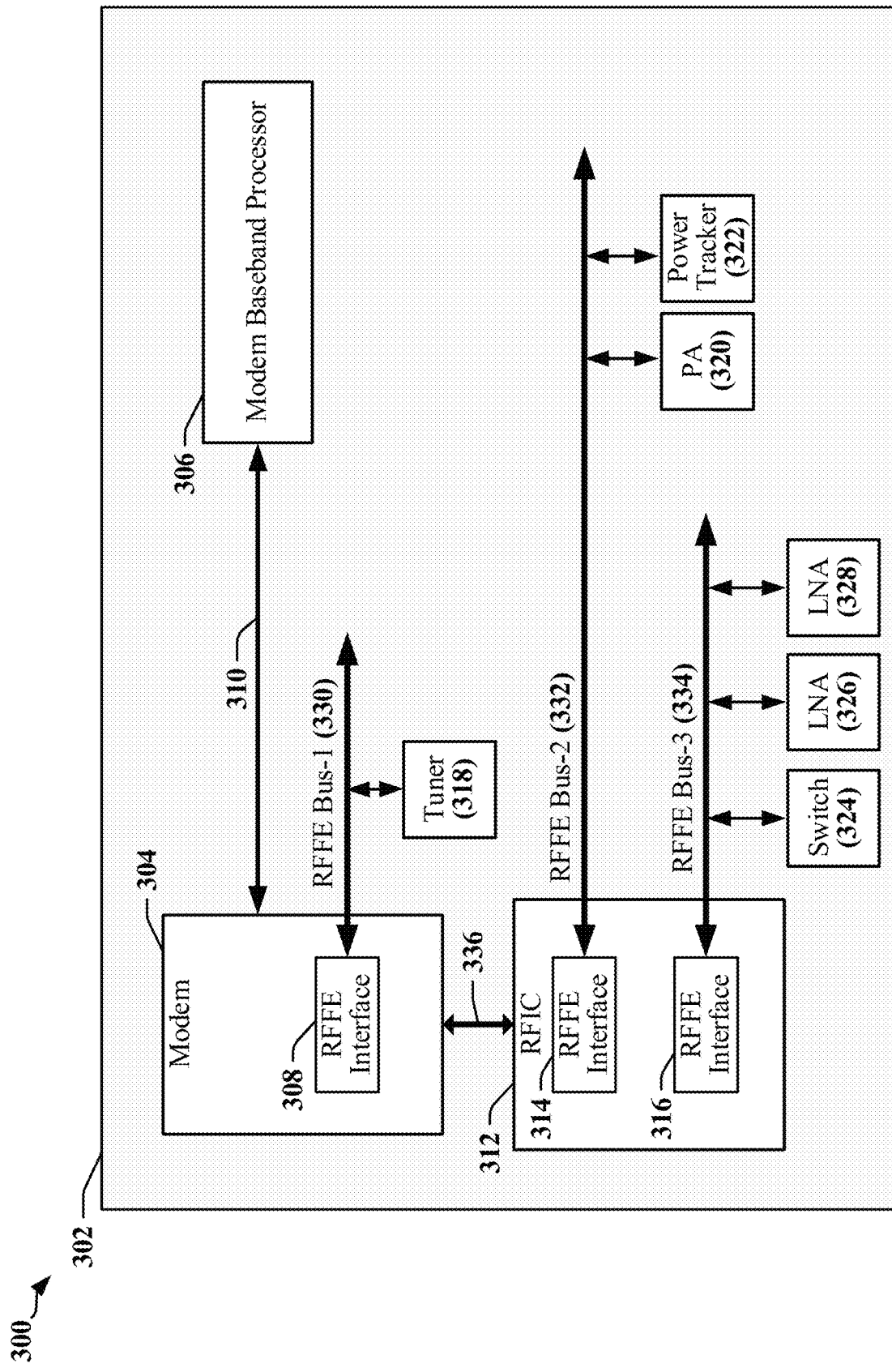
FIG. 3 illustrates a device configuration for coupling various radio frequency front-end devices using multiple RFFE buses.

FIG. 3 is a diagram 300 illustrating an example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through respective communication links 310, 336 or, in some implementations, through a common communication link 310 or 336. The illustrated device 302 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. In the illustrated example, the RFIC 312 communicates with a PA 320 and a power tracking module 322 through a first of its RFFE interfaces 314 and the second RFFE bus 332. In the illustrated example, RFIC 312 communicates with a switch 324 and one or more LNAs 326, 328 through a second of its RFFE interfaces 316 and the third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, delays associated with interrupt processing, the time required to terminate transmission of a datagram already in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more devices. Devices that can interfere with one another may exchange coexistence management (C×M) messages to permit each device to signal imminent actions that may result in interference or conflict. C×M messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. In the example illustrated in FIG. 3, two physical I/O pins are consumed on the RFIC 312 to support communication with three devices 324, 326, 328 over the third RFFE bus 334, whereas six or more physical I/O pins would be consumed if the RFIC 312 used point-to-point UART-based links to communicate with the three devices 324, 326, 328. Protocols that support communication over a multi-drop serial bus define datagram structures used to transmit command, control and data payloads. Datagram structures for different protocols define certain common features, including addressing used to select devices to receive or transmit data, clock generation and management, interrupt processing and device priorities. In this disclosure, the example of RFFE and SPMI protocols may be employed to illustrate certain aspects disclosed herein. However, the concepts disclosed herein are applicable to other serial bus protocols and standards. Some similarities exist between RFFE and SPMI datagram structures.

Figure 4:
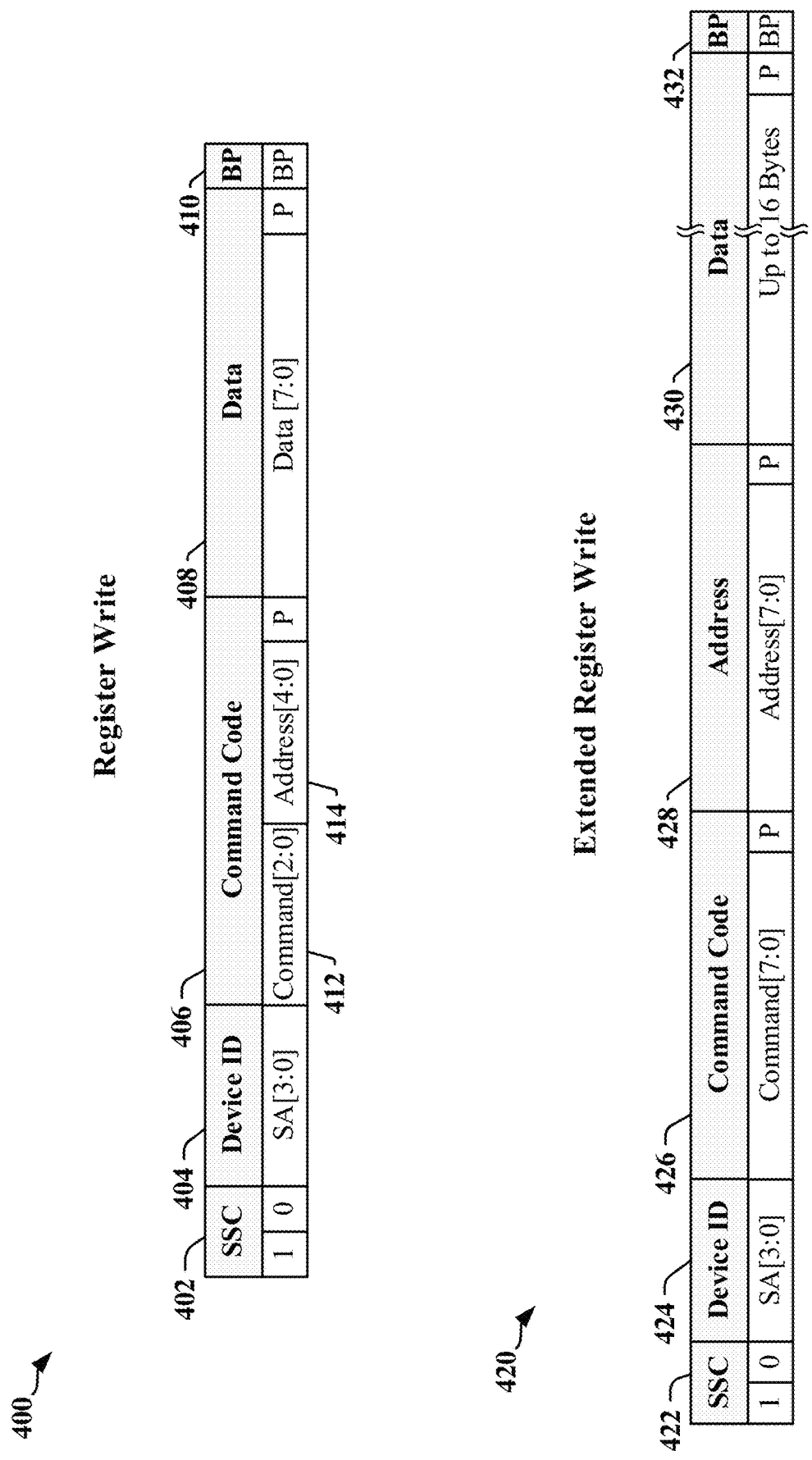
FIG. 4 illustrates datagram structures defined by RFFE protocols.

FIG. 4 illustrates datagram structures 400, 420 for a Register Write command and an Extended Register Write command. The datagram structures 400, 420 are defined by RFFE protocols, and can be used to efficiently write data to registers within the addressable register address range of a slave device. The datagram structures 400, 420 commence with transmission of a two-bit sequence start condition (SSC 402, 422) followed by a four-bit device ID 404, 424. A nine-bit command field 406, 426 is transmitted next. In the Register Write command datagram structure 400, the nine-bit command field 406 includes a three-bit command code 412, a five-bit address field 414 and a parity bit. In the Extended Register Write command data structure 420, the nine-bit command field 406 is occupied by an eight-bit command code and a parity bit and followed by an address field 428 that carries an eight-bit register address and a parity bit. In the Register Write command datagram structure 400, a data field 408 carries a single data byte, while in the Extended Register Write command datagram structure 420, the data field 430 carries up to 16 data bytes. Each data byte is transmitted with a parity bit. Bus park signaling 410, 432 terminates the datagram structures 400, 420.

Triggers Transmitted Over a Multidrop Bus

Triggers provide an essential mechanism for RF front-end control, and triggers may be used to coordinate activities of different front-end components. For example, triggers can be used for a variety of purposes including beam steering or beamforming, gain setting, antenna path multiplexer control, etc. Certain aspects of triggers are presented here in the context of beam steering applications, as illustrated in FIGS. 5 and 6.

Beam steering or beamforming may be obtained when a transmitting device applies amplitude and phase controls to data signals transmitted through multiple antennas in an array of antennas and/or where a receiving device applies amplitude and phase controls to data signals received from a number of antennas. Examples of antenna arrays include a one-dimensional linear array, a two-dimensional square array, a two-dimensional rectangular array and a two-dimensional circular array. At a given time, a directed beam can be formed in a particular direction or angle relative to the antenna array.

Figure 5:
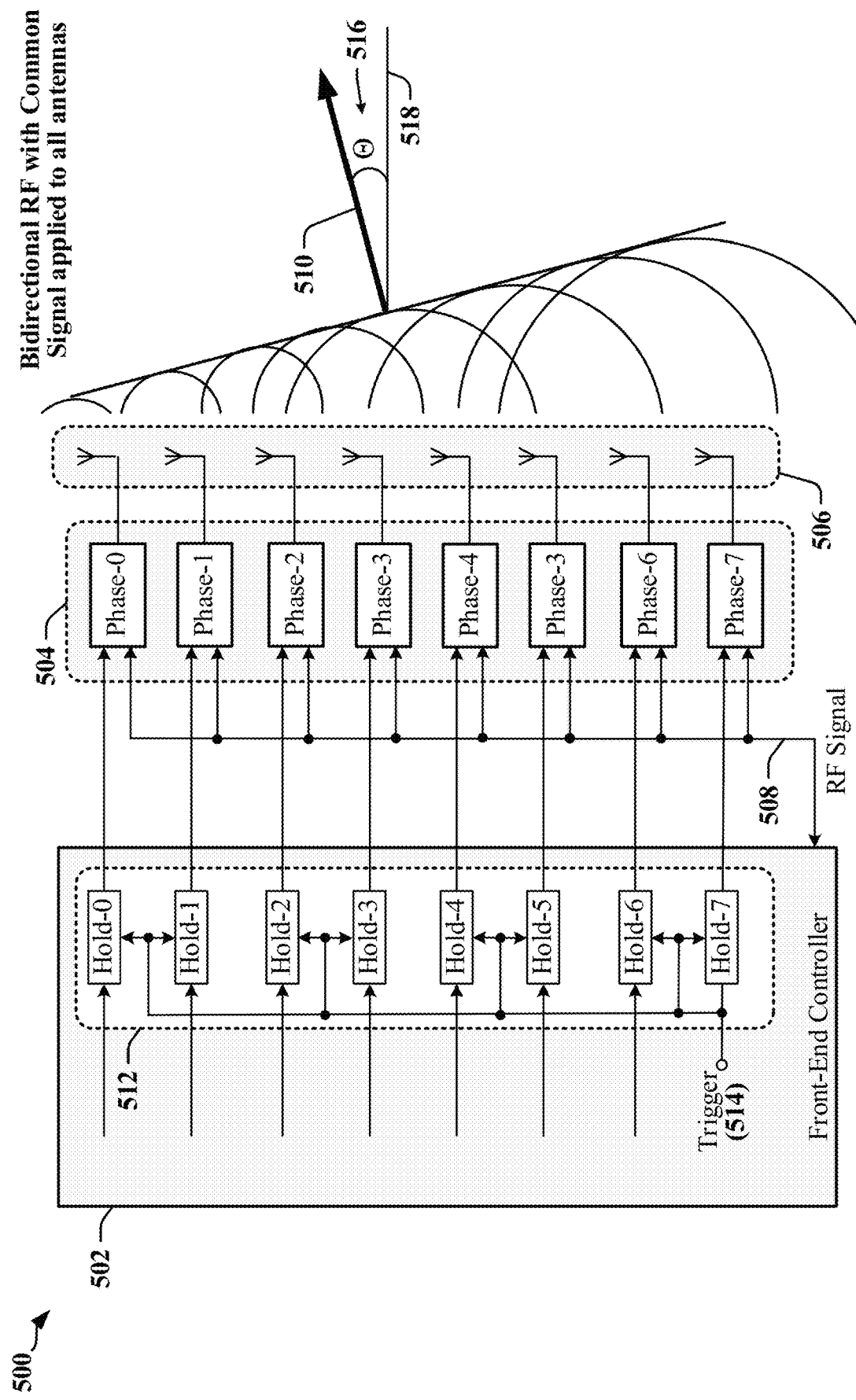
FIG. 5 illustrates a first example of a radio frequency front-end controller that employs triggers to configure and control the operation of an antenna array.
Figure 6:
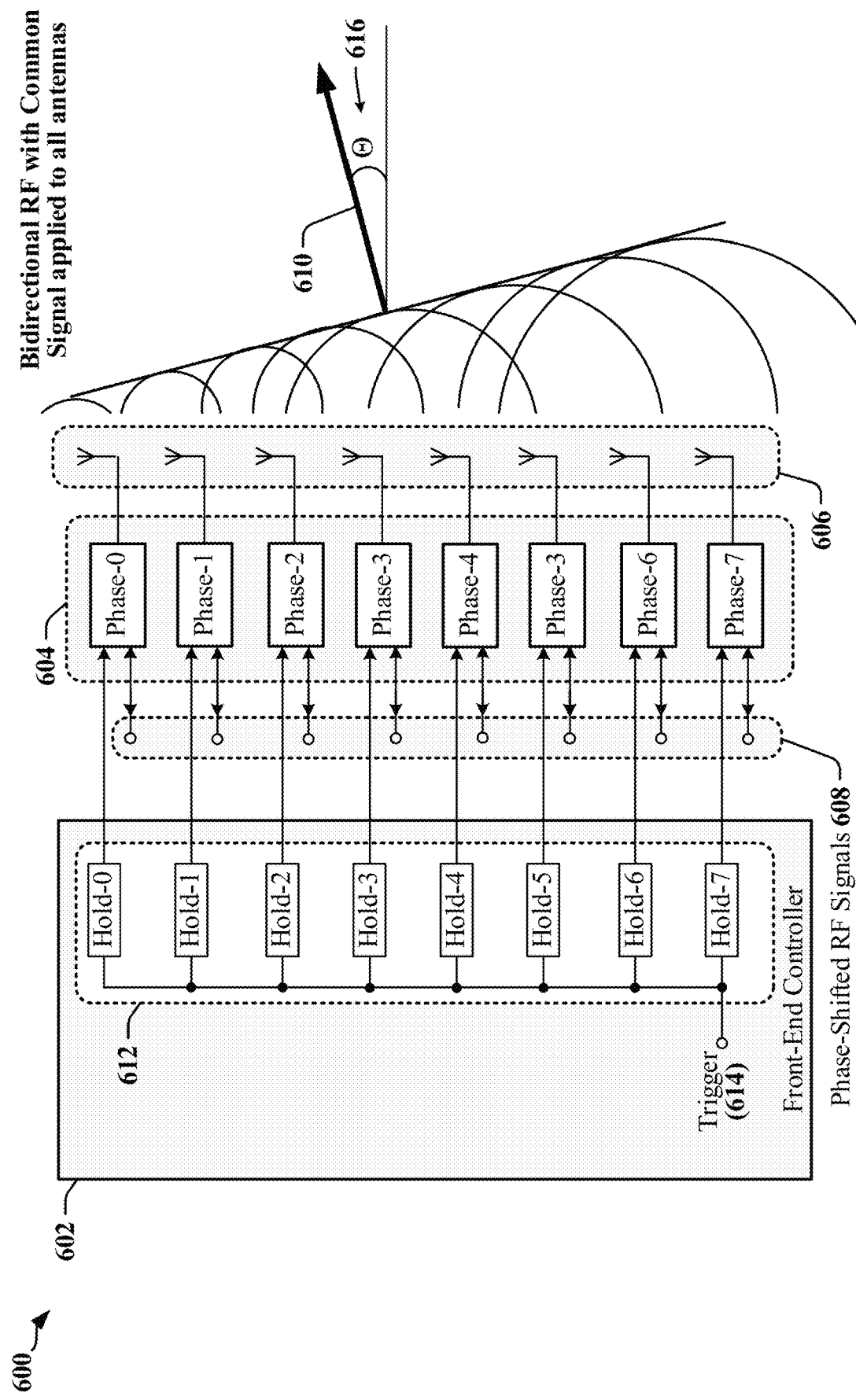
FIG. 6 illustrates a second example of a radio frequency front-end controller that employs triggers to configure and control the operation of an antenna array.

FIG. 5 illustrates a first example of a beam steering RF front-end 500. In an array of identical radiating antenna elements, five factors within an operational frequency range can be defined that control the beam shape in a given direction, including configuration, geometry, amplitude, phase and antenna pattern. Frequency determines the operating wavelength λ. The configuration factor may be defined as the geometrical configuration of the array, such as linear, rectangular, or circular. The geometry factor may be defined as the relative displacement between antenna elements in an antenna array 506, such as the physical distance between elements in a linear array. In some examples, the geometry factor may define a physical distance between two or more antenna elements as λ/2. The amplitude factor may be defined as the excitation amplitude of individual antenna elements in the antenna array 506. The amplitude factor may be expressed in relative terms such as equal or weighted amplitudes. The phase factor may be defined as the excitation phase of individual antenna elements. The phase factor may be expressed in relative terms such as equal or linearly increasing phase angles. The pattern factor may be defined as the radiation pattern of individual antenna elements, including an omnidirectional pattern for example. In some implementations, the configuration, geometry, pattern and frequency are fixed, with the amplitude and phase being adjustable. In some implementations a further simplification is adopted by fixing the amplitude for each antenna element in the antenna array 506, and leaving only the phase variable for each antenna element.

Beamforming may be referred to as spatial filtering to represent its directivity or beam pointedness in a given direction of space. In Multi-User Multiple Input Multiple Out (MU-MIMO) beamforming, which can also be referred to as implicit beamforming, phase changes are inserted by an WiFi Access Point or 4G/5G Base Station into the data stream at baseband. Baseband signals are directed through various RF circuits to respective antenna elements in the antenna array 506. Phase-shifting circuits 504 may apply a universal phase-shift, no phase shift and/or calibration phase shifts based on design and/or context.

In self-steering beamforming, which is also known as explicit beamforming, phase changes are inserted by the transmitter to achieve a directed beam in a given direction toward a client receiver.

In some implementations, a hybrid of MU-MIMO and self-steering beamforming can be employed.

In the example illustrated in FIG. 5, the antenna elements include eight linear uniformly-spaced antennas forming the antenna array 506. The antenna array 506 can be directed to beamform to a selected propagation path 510 that lies at an angle 516 (Θ) relative to the perpendicular 518 of the array elements. Given a desired value of Θ, a processor in the RF front-end controller 502, a baseband controller, or other device may generate the phase offsets for each antenna relative to a given reference phase Φ. In some cases, Φ can be set to zero. The beam direction equation for the phase offset, ΔΦ(Θ), for each antenna element may be given by the following:

$$\Delta\Phi(\Theta) = 360° \times d \times \sin(\Theta) / \lambda.$$

The phase offsets may be applied to baseband signals directed to the antenna elements or to a common RF signal provided to all of the antenna elements.

In the beam steering example illustrated in FIG. 5, phase-shifting circuits 504 may apply different phase shifts to a common RF signal at the antenna array 506. The RF front-end 500 may be adapted to use triggers to configure and control the operation of the phase-shifting circuits 504 and the antenna array 506. The phase-shifting circuits 504 and antenna array 506 may be collocated in the same device IC or package, or may be packaged separately. In various implementations, the RF front-end controller 502 may receive commands, configuration information and triggers from an RFIC, RF front-end controller 502, or other processing device. In the illustrated example, the RF front-end controller 502 may configure the antenna array 506 for beam steering. Beam steering can increase RF signal strength along a selected propagation path 510 or increase the sensitivity of the antenna array 506 to RF signals received from the selected propagation path 510.

When transmitting, each antenna in the antenna array 506 receives a phase-shifted version of an RF signal 508 for transmission. A set of phase-shifting circuits 504 provides the phase offset calculated for each antenna element in the antenna array 506 to the RF signal 508. One or more different phase offsets may be applied to the RF signal 508 for transmission by the antenna array 506. The phase-shifting circuits 504 can be configured to cause constructive interference along the selected propagation path 510, and destructive interference along other propagation paths.

When receiving an RF signal, the set of phase-shifting circuits 504 selectively applies a phase offset to the RF signal received at each antenna in the antenna array 506. Phase-shifted versions of the received RF signals are combined to provide the received RF signal 508. The set of phase-shifting circuits 504 applies the phase offset calculated for each signal received from the antenna array 506. The set of phase-shifting circuits 504 is configured to introduce constructive interference to signals received from the selected propagation path 510, and destructive interference to signals received from other propagation paths.

The RF front-end controller 502 may receive configuration information to be provided to the set of phase-shifting circuits 504 when a change in beam direction (selected propagation path 510) is desired or required. The configuration information may include phase offset, amplitude and other parameters that may be stored in respective elements of holding registers 512. In some instances, the holding registers 512 may be written directly by a processor in the RF front-end controller 502 that generates the phase offsets for each antenna. In some implementations, the holding registers 512 may be accessible through a serial bus and may be configured by an external processor, baseband controller, or other device that can generate the phase offsets for each antenna. In one aspect, antenna control parameters may be expressed as, or viewed as complex numbers including amplitude and phase values, where the holding registers 512 can store amplitude values and phase offset values. Different sets of registers may be provided and configured when both amplitude and phase offset information is generated to control the antenna array 506.

In one example, the RF front-end controller 502 stores phase offset values for the set of phase-shifting circuits 504 in all or a set of the holding registers 512. Each of the holding registers 512 may hold a phase offset that can be used to configure a corresponding phase-shifting circuit. A trigger signal 514 causes the phase offsets stored in holding registers 512 to be transferred to corresponding phase-shifting circuits 504. In conventional systems, the trigger signal 514 is fired in response to a message received from an RFFE bus. The RFFE bus may also be used to write the configuration information into the holding registers 512.

FIG. 6 illustrates a second example of a beam steering RF front-end 600. In this example, multiple phase-shifted RF signals 608 are generated by applying phase offsets to a base RF signal. The phase-shifted RF signals 608 are directed to the antenna array 606. Phase-shifting circuits 604 may apply further phase offsets and/or amplitude adjustments to the phase-shifted RF signals 608. The phase-shifting circuits 604 and antenna array 606 may be collocated in the same device IC or package, or may be packaged separately. The RF front-end 600 may be adapted to use triggers to configure and control the operation of the phase-shifting circuits 604 and the antenna array 606. In various implementations, the RF front-end controller 602 may generate or receive commands, configuration information and triggers from an RFIC, RF front-end controller 602, or other processing device. In the illustrated example, the RF front-end controller 602 may configure the antenna array 606 for beam steering. Beam steering can increase RF signal strength along a selected propagation path 610 or increase the sensitivity of the antenna array 606 to RF signals received from the selected propagation path 610.

When transmitting, each antenna in the antenna array 606 receives one of the phase-shifted RF signals 608 for transmission. One or more additional different phase offsets may be applied to the phase-shifted RF signals 608. The phase offsets in the phase-shifted RF signals 608 may be calculated to cause constructive interference along the selected propagation path 610, and destructive interference along other propagation paths.

When receiving, the set of phase-shifting circuits 604 may selectively apply phase offsets to RF signals received at each antenna in the antenna array 606. These phase-shifted RF signals 608 may be provided to an RFIC, RF front-end controller 602, or other processing device.

The RF front-end controller 602 may receive configuration information that is to be provided to the set of phase-shifting circuits 604. The configuration information may include phase offset, amplitude and other parameters that may be stored in respective elements of the holding registers 612. In one aspect, antenna control parameters may be represented as, or viewed as complex numbers including amplitude and phase values, where the holding registers 612 can store amplitude values and phase offset values. Different sets of registers may be provided and configured when both amplitude and phase offset information is generated to control the antenna array 606.

In one example, the RF front-end controller 602 stores phase offset values for the set of phase-shifting circuits 604 in a set of the holding registers 612, where each register holds a phase offset that can be used to configure a corresponding phase-shifting circuit. A trigger signal 614 causes the phase offsets stored in the set of holding registers 612 to be transferred to corresponding phase-shifting circuits 604. In conventional systems, the trigger signal 614 is fired in response to a message received from an RFFE bus. The RFFE bus may also be used to write the configuration information into the holding registers 612.

When a new angle 516, 616 ($\Theta$) for the propagation path 510, 610 is desired, a new $\Delta\Phi(\Theta)$ offset is computed. In a swept beam system, a new $\Theta$ value may be desired quite rapidly depending on the application. In one example, the antenna array 506, 606 is switched between five beam directions: {−80°, −40°; 0°; 40°; 80°}. The antenna array 506, 606 may be operated such that it dwells for a duration of time (time slot) at each beam direction, where the same or different dwell times can be defined for different time slots. A unique phase offset between antennas ($\Delta\Phi(\Theta)$) can be calculated for each time slot and its corresponding beam direction $\Theta$. In an example where dwell time of one microsecond is defined for each angle, a complete sweep of the five beam directions is performed in approximately 5 microseconds.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax WLAN standard defined by the Institute of Electrical and Electronics Engineers (IEEE) 802.11 Working Group can result in a required 50% reduction in latency at conventional bus clock frequencies. In one example, 5G and 802.11ax networks use antenna arrays to implement beamforming/beam steering to increase network capacity, and these networks typically require rapid changes in beam direction that can be achieved only when reconfiguration is accomplished with low latency.

Certain aspects disclosed herein define structures for low-latency datagrams that can be used to significantly reduce bus latency by reducing clock-cycle overhead. In one example, clock-cycle overhead may be calculated as the number of clock cycles used to transmit the fields in an RFFE datagram that do not carry payload data. Latency can be reduced using register-configurable trigger-activation mechanisms and datagram structure optimizations that decrease clock-cycle overhead associated with transmission of trigger activation information. In one example, clock-cycle overhead includes the clock cycles used to transmit the fields of an RFFE datagram that do not carry payload data. A first mechanism defines a command code with a first Trigger-Activation datagram, and a second mechanism defines a command code with a second Trigger-Activation datagram that uses a 4-bit Magic-ID and eliminates 18 clock cycles from the conventional Extended Register Write datagram structure.

Figure 7:
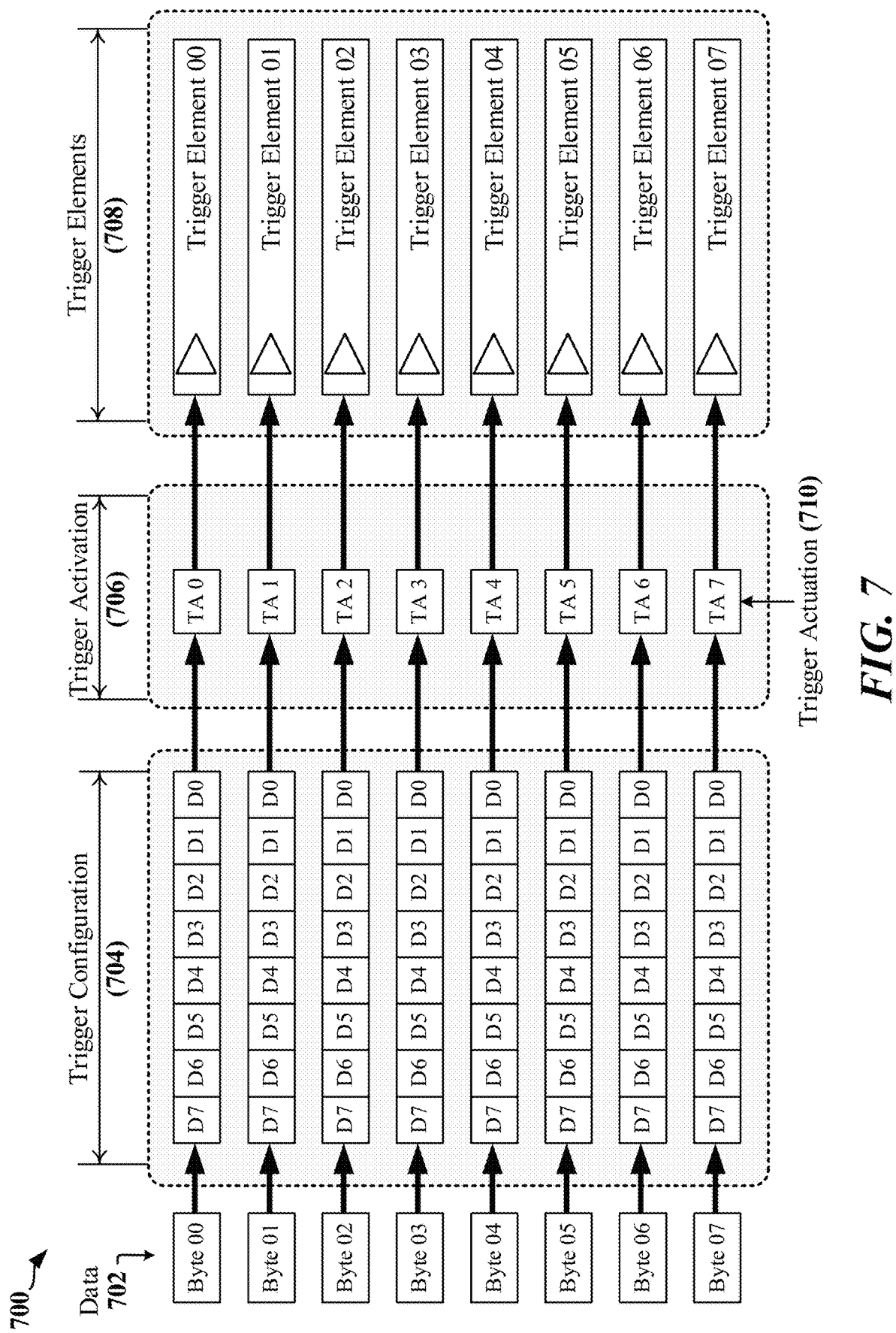
FIG. 7 illustrates triggered activation of configuration changes in a radio frequency front-end in accordance with certain aspects disclosed herein.

FIG. 7 illustrates a scheme 700 for triggered activation of configuration changes in an RF front-end that may be adapted in accordance with certain aspects disclosed herein. In the illustrated example, configuration information can be received in a plurality of data bytes 702. In other examples, configuration information may be supplied in other units of data, including nibbles, words and/or data units with a configurable number of bits. In the illustrated example, the plurality of data bytes 702 includes eight data bytes, the content of which may be stored in trigger configuration registers 704. The trigger configuration registers 704 may include one or more registers that have different sizes from other registers, and different-sized data units may be provided as configuration information to certain trigger configuration registers 704. The trigger configuration registers 704 may be written in a configuration transaction conducted over a serial bus, which may be operated in accordance with an RFFE protocol. A trigger activation procedure may be employed to cause the contents of the trigger configuration registers 704 to be forwarded to a target that is to be configured.

Trigger activation logic 706 may be configured to enable the contents of the trigger configuration registers 704 to be transferred to respective target devices in response to a trigger command or trigger actuation signal 710 received from a controlling device. In conventional systems, one or more trigger actuation commands may be transmitted to trigger the activation of configuration of at least a portion of targeted trigger elements 708. The trigger elements 708 may include switches 324, LNAs 326, 328, PAs 320 and other types of device that operate concurrently in an RF front-end. In one example, a trigger actuation transmission may configure a mask or gating logic that determines which trigger elements 708 will receive data from the trigger configuration registers 704 during actuation initiated by the trigger actuation signal 710. The trigger actuation signal 710 may be initiated at the end of a datagram used to carry a trigger actuation command, which may be provided in accordance with a datagram structure 400, 420 for the Register Write command structure 400 or the Extended Register Write command structure 420 illustrated in FIG. 4.

FIG. 8 illustrates a conventional Extended Register Write datagram 800 and a first low-latency datagram 820 that may be used to carry a low-latency Trigger-Activation command. The conventional Extended Register Write datagram 800 has a clock-cycle overhead of 25 clock cycles. The clock-cycle overhead includes the clock cycles used to transmit the SSC 802, device or group identifier 804, a command field 806 (and parity), an address field 808 (and parity) and bus park cycle 812. One or more trigger activation bytes may be carried in the payload 810 of the conventional Extended Register Write datagram 800.

A first low-latency datagram 820 has a clock-cycle overhead of 16 clock cycles, which is a reduction of 36% in clock-cycle overhead (reduction of 9 clock cycles) with respect to the conventional Extended Register Write datagram 800. The first low-latency datagram 820 carries a Low-Latency Trigger-Activation LLTA command code that eliminates the need for a register address field. The LLTA command code is transmitted with a parity bit in a command field 826. The clock-cycle overhead for the first low-latency datagram 820 includes the clock cycles used to transmit the SSC 822, device or group identifier 824, the command field 826 and the bus park cycle 830. One or more trigger activation bytes may be carried in the payload 828 of the first low-latency datagram 820.

In one example, devices coupled to an RFFE bus may be adapted to recognize the LLTA command code, and to automatically direct the payload 828 of the first low-latency datagram 820 to preconfigured register addresses. The LLTA command code may indicate the number of bytes of Trigger-Activation information in the payload 828. The transmission of the bus park cycle 830 at the end of the low-latency datagram 820 may be used by the receiver as a trigger to activate the configuration defined by the payload 828 transmitted in the low-latency datagram 820. In an example where the payload 810, 828 carries two bytes, the first low-latency datagram 820 has a total latency that may be expressed as 34 clock cycles, which is a reduction of 20.9% over the total latency of the conventional Extended Register Write datagram 800.

FIG. 9 illustrates a conventional Extended Register Write datagram 900 and a second low-latency datagram 920 that includes a reserved device or group identifier that may be referred to herein as a Magic-ID. The conventional Extended Register Write datagram 900 has a clock-cycle overhead of 25 clock cycles. The clock-cycle overhead includes the clock cycles used to transmit the SSC 902, device or group identifier 904, a command field 906 (and parity), an address field 908 (and parity) and bus park cycle 912. One or more trigger activation bytes may be carried in the payload 910 of the conventional Extended Register Write datagram 900.

A second low-latency datagram 920 has a clock-cycle overhead of 7 clock cycles, which is a reduction of 72% in clock-cycle overhead (reduction of 18 clock cycles) with respect to the conventional Extended Register Write datagram 900. The second low-latency datagram 920 carries the Magic-ID 924 that eliminates the need for a command code and a register address field. Slave devices recognize the Magic-ID 924 as indicating a trigger activation command directed to preconfigured registers. The clock-cycle overhead for the second low-latency datagram 920 includes the clock cycles used to transmit the SSC 922, Magic-ID 924 and the bus park cycle 928. One or more trigger activation bytes may be carried in the payload 926 of the second low-latency datagram 920.

In one example, one or more devices coupled to an RFFE bus may be adapted to respond to the Magic-ID 924. These devices may respond to the Magic-ID 924 by processing the payload 926 in the second low-latency datagram 920. The payload 926 may be written to registers at preconfigured register addresses. In some instances, the Magic-ID 924 may implicitly or explicitly indicate the number of bytes of Trigger-Activation information in the payload 926. For example, different Magic-ID values may be defined for different payload sizes and devices that receive the second low-latency datagram 920 may be configured with information that defines payload size and/or the starting address of registers that are to receive the payload 926.

The transmission of the bus park cycle 928 (i.e., the end of the low-latency datagram 920) may be used by the receiver as a trigger to activate the configuration defined by the payload 926 transmitted in the low-latency datagram 920. In an example where the payload 910, 926 carries two bytes, the first low-latency datagram 920 has a total latency that may be expressed as 27 clock cycles, which is a reduction of 41.8% over the total latency of the conventional Extended Register Write datagram 900.

Figure 10:
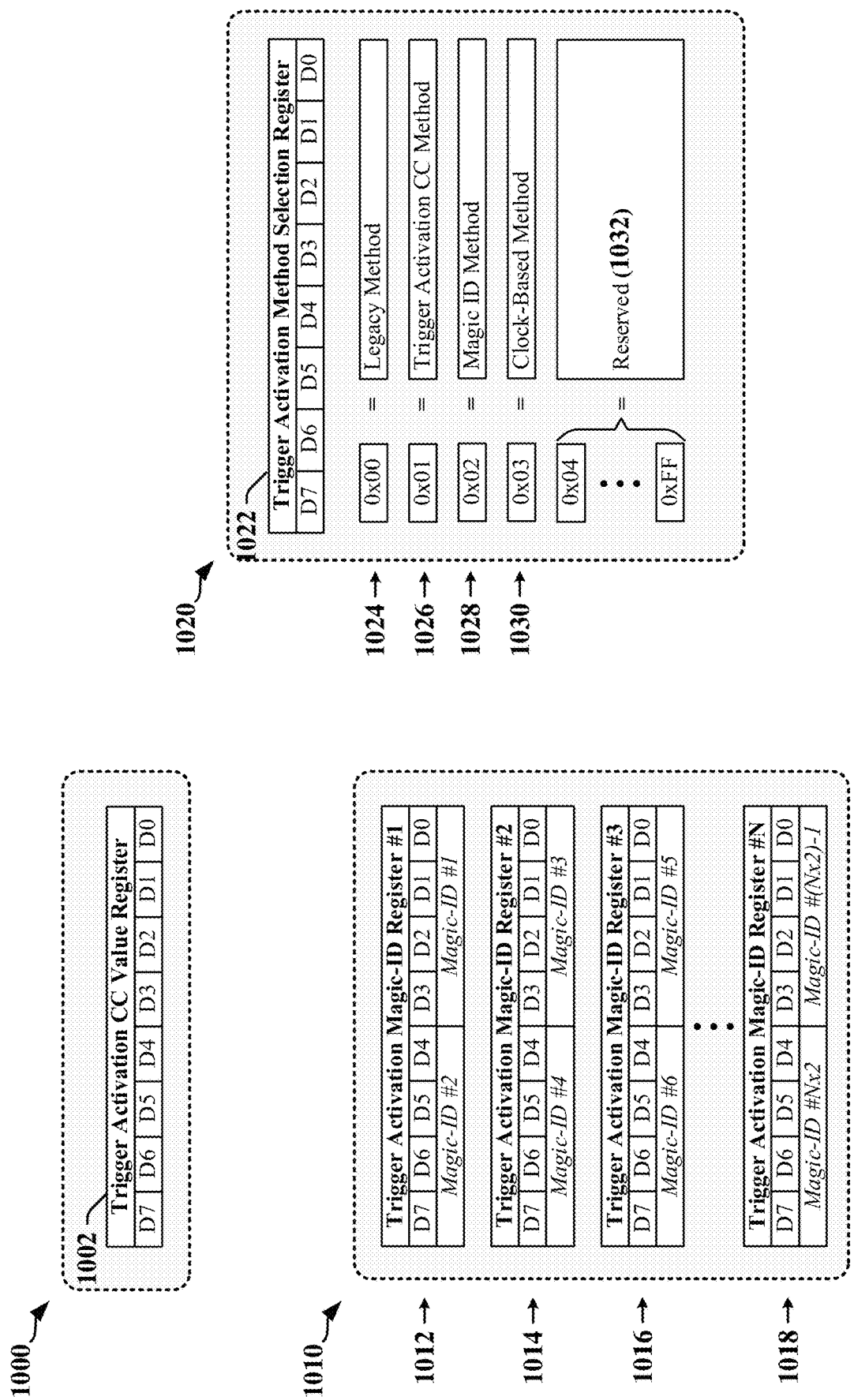
FIG. 10 illustrates examples of configuration information maintained by devices adapted to receive low-latency datagrams in accordance with certain aspects disclosed herein.

Devices that are the target of low-latency datagrams 820, 920 may be configured with information that defines trigger activation procedures. In one example, the address of the first register to be written and/or the size of payloads 828, 926 may be maintained in one or more registers. FIG. 10 illustrates examples of configuration information 1000, 1010, 1020 that may be maintained by devices adapted to receive low-latency datagrams 820, 920 transmitted in accordance with certain aspects disclosed herein. In a first example of configuration information 1000, one or more registers 1002 may be configured with a Trigger-Activation command code. Multiple Trigger-Activation command codes may be defined when Trigger-Activation information can be directed to multiple devices or sets of devices. In some instances, a protocol handler, which may be implemented using a finite state machine, may be adapted to compare command codes received from a serial bus with a register 1002 that defines a Trigger-Activation command code.

In a second example of configuration information 1010, one or more registers 1012, 1014, 1016, 1018 may be configured with Magic-IDs. In an RFFE implementation, each register 1012, 1014, 1016, 1018 may store one or two four-bit Magic-IDs. A Magic-ID may identify a single device and/or a group of devices. In some instances, a device may be adapted to respond to multiple Magic-IDs, where each Magic-ID identifies different trigger elements 708 within the device or within multiple devices.

In a third example of configuration information 1020, a mode register 1022 may be configured with mode information that defines the type of Trigger-Activation transmission that is to be handled by a device. A first value 1024 stored in the mode register 1022 may indicate that Trigger-Activation is to be transmitted in conventional or legacy mode datagrams. A second value 1026 stored in the mode register 1022 may indicate that a configured Trigger-Activation command code is to be transmitted in a datagram that includes no address field. A third value 1028 stored in the mode register 1022 may indicate that Trigger-Activation information is to be transmitted in a datagram that includes a Magic-ID. Other values 1030, 1032 stored in the mode register 1022 may indicate that another type of Trigger-Activation datagram or procedure is to be used. For example, a value 1030 stored in the mode register 1022 may indicate a clock-based Trigger-Activation procedure is to be used. Other values 1032 may be defined according to application needs.

Examples of Processing Circuits and Methods

Figure 11:
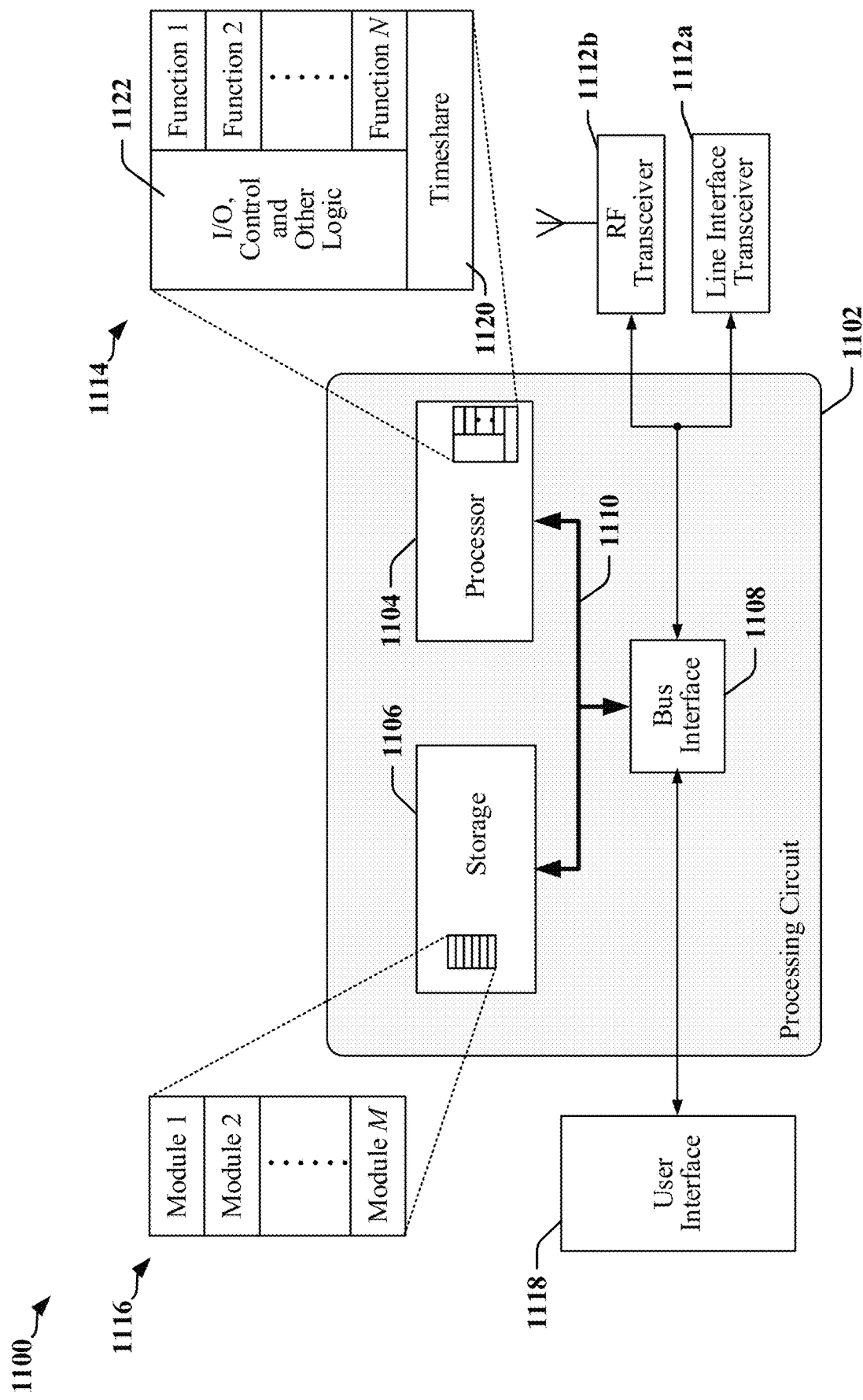
FIG. 11 illustrates one example of an apparatus employing a processing circuit that may be adapted according to certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as a transceiver 1112*a*, 1112*b*, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to a transceiver 1112*a*, 1112*b*, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112*a*, 1112*b*, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 12:
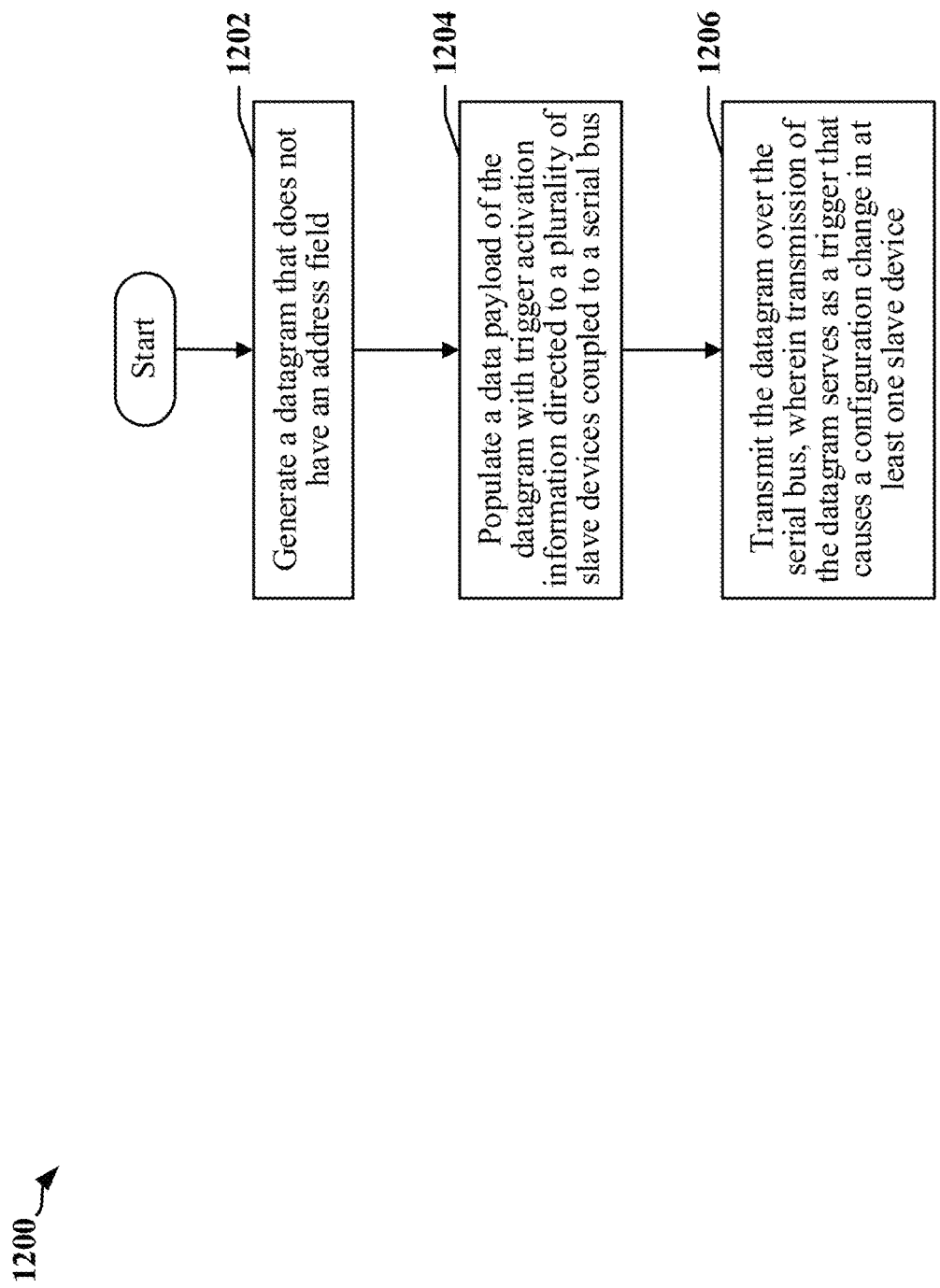
FIG. 12 is a flowchart that illustrates certain aspects disclosed herein.

FIG. 12 is a flowchart 1200 of a method that may be performed by a device coupled to a serial bus. In one example, the serial bus may be operated in accordance with an RFFE protocol. At block 1202, the device may generate a datagram that does not have an address field. At block 1204, the device may populate a data payload of the datagram with trigger activation information directed to a plurality of slave devices coupled to a serial bus. At block 1206, the device may transmit the datagram over the serial bus. Transmission of the datagram may serve as a trigger that causes a configuration change in at least one slave device.

In some examples, a command field is provided in the datagram with a trigger activation command code selected to cause the plurality of slave devices to respond to the datagram by writing trigger activation data to a register address associated with the trigger activation command code. The trigger activation command code may be written to a configuration register in each of the plurality of slave devices before the datagram is transmitted over the serial bus.

In certain examples, the trigger activation information is directed to one or more trigger elements in the plurality of slave devices. The trigger elements may include a phase-shifting circuit coupled to an antenna. The trigger activation information may be selected to configure a mask or gating logic that enables reconfiguration of the one or more trigger elements responsive to the trigger activation information.

In various examples, an address field of the datagram may be populated with a trigger activation device identifier that identifies the datagram as a trigger activation datagram. The datagram may be generated without a command field. The trigger activation device identifier may be written to a configuration register in each of the plurality of slave devices before transmitting the datagram over the serial bus. The trigger activation device identifier may be selected to cause the plurality of slave devices to respond to the datagram by writing trigger activation data to a register address associated with the trigger activation device identifier. The datagram may be transmitted over the serial bus in accordance with an RFFE protocol.

Figure 13:
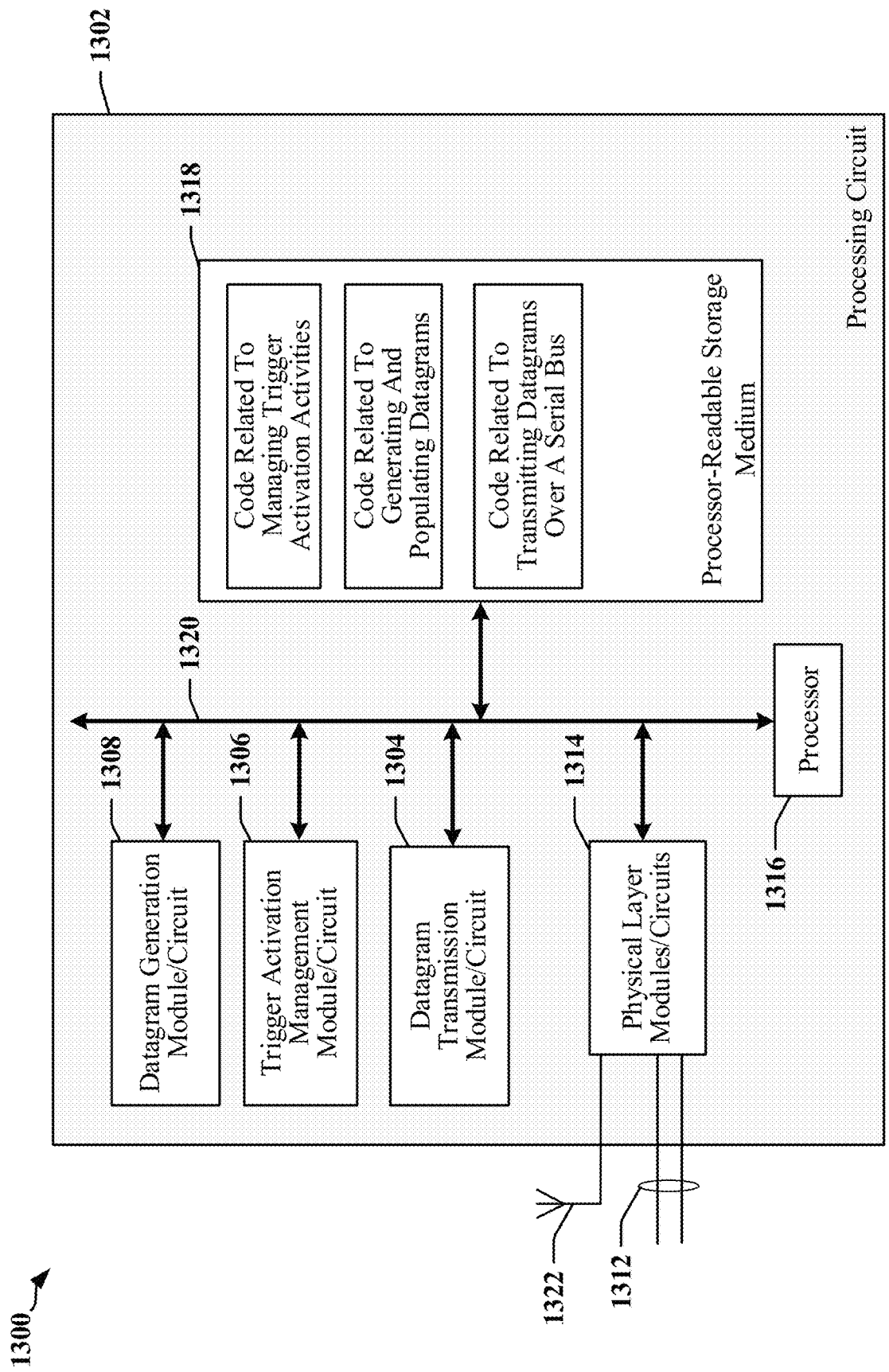
FIG. 13 illustrates an example of a hardware implementation for an apparatus adapted in accordance with certain aspects disclosed herein.

FIG. 13 is a diagram illustrating a simplified example of a hardware implementation for an apparatus 1300 employing a processing circuit 1302. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308 and the processor-readable storage medium 1318. One or more physical layer circuits and/or modules 1314 may be provided to support communications over a communication link implemented using a multi-drop serial bus 1312, through an antenna or antenna array 1322 (to a radio access network for example), and so on. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The processor-readable storage medium 1318 may include a non-transitory storage medium. The software, when executed by the processor 1316, causes the processing circuit 1302 to perform the various functions described supra for any particular apparatus. The processor-readable storage medium 1318 may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 adapted to generate low-latency datagrams, including datagrams that do not include a slave address field and/or a command field. The apparatus 1300 may include modules and/or circuits 1306 adapted to generate trigger activation information that causes one or more slave devices to trigger a configuration change in a bus arbitration or sequence of bus arbitrations. The apparatus 1300 may include modules and/or circuits 1304 adapted to configure, conduct and/or participate in a transaction over the serial bus that includes transmitting the low-latency datagrams.

In one example, the apparatus 1300 includes physical layer circuits and/or modules 1314 that implement an interface circuit adapted to couple the apparatus 1300 to the multi-drop serial bus 1312, including a first serial bus. The apparatus 1300 may have a processor configured to generate a datagram that does not have an address field, populate a data payload of the datagram with trigger activation information directed to a plurality of slave devices coupled to a serial bus, and transmit the datagram over the serial bus. Transmission of the datagram may serve as a trigger that causes a configuration change in at least one slave device.

In some instances, the processor is further configured to provide a command field in the datagram with a trigger activation command code selected to cause the plurality of slave devices to respond to the datagram by writing trigger activation data to a register address associated with the trigger activation command code. The processor may be further configured to write the trigger activation command code to a configuration register in each of the plurality of slave devices before transmitting the datagram over the serial bus. The trigger activation information may be directed to one or more trigger elements in the plurality of slave devices. The trigger elements may include a phase-shifting circuit coupled to an antenna. The processor may be further configured to select the trigger activation information to configure a mask or gating logic that enables reconfiguration of the one or more trigger elements responsive to the trigger activation information.

In some instances, the processor is further configured to populate an address field in the datagram with a trigger activation device identifier that identifies the datagram as a trigger activation datagram. The datagram may be generated without a command field. The processor may be further configured to write the trigger activation device identifier to a configuration register in each of the plurality of slave devices before transmitting the datagram over the serial bus. The trigger activation device identifier may be selected to cause the plurality of slave devices to respond to the datagram by writing trigger activation data to a register address associated with the trigger activation device identifier. The datagram may be transmitted over the serial bus in accordance with an RFFE protocol.

The processor-readable storage medium 1318 may include transitory or non-transitory storage devices configured to store code, instructions and/or parameters used to implement one or more methods or procedures disclosed herein. The processor-readable storage medium 1318 may include code for generating a datagram that does not have an address field, populating a data payload of the datagram with trigger activation information directed to a plurality of slave devices coupled to a serial bus, and transmitting the datagram over the serial bus. Transmission of the datagram may serve as a trigger that causes a configuration change in at least one slave device.

The processor-readable storage medium 1318 may include code for providing a command field in the datagram with a trigger activation command code selected to cause the plurality of slave devices to respond to the datagram by writing trigger activation data to a register address associated with the trigger activation command code, and writing the trigger activation command code to a configuration register in each of the plurality of slave devices before transmitting the datagram over the serial bus. The trigger activation information may be directed to one or more trigger elements in the plurality of slave devices. The trigger activation information may be directed to one or more trigger elements in the plurality of slave devices. The processor-readable storage medium 1318 may include code for selecting the trigger activation information to configure a mask or gating logic that enables reconfiguration of the one or more trigger elements responsive to the trigger activation information.

The processor-readable storage medium 1318 may include code for populating an address field of the datagram with a trigger activation device identifier that identifies the datagram as a trigger activation datagram, and writing the trigger activation device identifier to a configuration register in each of the plurality of slave devices before transmitting the datagram over the serial bus. The datagram may be generated without a command field. The trigger activation device identifier may be selected to cause the plurality of slave devices to respond to the datagram by writing trigger activation data to a register address associated with the trigger activation device identifier.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of data communications, comprising:
generating a datagram that does not have an address field;
populating a data payload of the datagram with trigger activation information directed to a plurality of slave devices coupled to a serial bus; and
transmitting the datagram over the serial bus, wherein transmission of the datagram serves as a trigger that causes a configuration change in at least one slave device.

2. The method of claim 1, further comprising:
providing a command field in the datagram with a trigger activation command code selected to cause the plurality of slave devices to respond to the datagram by writing trigger activation data to a register address associated with the trigger activation command code.

3. The method of claim 2, further comprising:
writing the trigger activation command code to a configuration register in each of the plurality of slave devices before transmitting the datagram over the serial bus.

4. The method of claim 1, wherein the trigger activation information is directed to one or more trigger elements in the plurality of slave devices.

5. The method of claim 4, wherein the one or more trigger elements include a phase-shifting circuit coupled to an antenna.

6. The method of claim 4, further comprising:
selecting the trigger activation information to configure a mask or gating logic that enables reconfiguration of the one or more trigger elements responsive to the trigger activation information.

7. The method of claim 1, further comprising:
populating a device identifier field of the datagram with a trigger activation device identifier that identifies the datagram as a trigger activation datagram, wherein the datagram is generated without a command field.

8. The method of claim 7, further comprising:
writing the trigger activation device identifier to a configuration register in each of the plurality of slave devices before transmitting the datagram over the serial bus.

9. The method of claim 7, wherein the trigger activation device identifier is selected to cause the plurality of slave devices to respond to the datagram by writing trigger activation data to a register address associated with the trigger activation device identifier.

10. The method of claim 1, wherein the datagram is transmitted over the serial bus in accordance with an RFFE protocol.

11. An apparatus comprising:
an interface circuit adapted to couple the apparatus to a serial bus; and
a processor configured to:
generate a datagram that does not have an address field;
populate a data payload of the datagram with trigger activation information directed to a plurality of slave devices coupled to the serial bus; and
transmit the datagram over the serial bus,
wherein transmission of the datagram serves as a trigger that causes a configuration change in at least one slave device.

12. The apparatus of claim 11, wherein the processor is further configured to:
provide a command field in the datagram with a trigger activation command code selected to cause the plurality of slave devices to respond to the datagram by writing trigger activation data to a register address associated with the trigger activation command code.

13. The apparatus of claim 12, wherein the processor is further configured to:
write the trigger activation command code to a configuration register in each of the plurality of slave devices before transmitting the datagram over the serial bus.

14. The apparatus of claim 11, wherein the trigger activation information is directed to one or more trigger elements in the plurality of slave devices.

15. The apparatus of claim 14, wherein the one or more trigger elements include a phase-shifting circuit coupled to an antenna.

16. The apparatus of claim 14, wherein the processor is further configured to:
select the trigger activation information to configure a mask or gating logic that enables reconfiguration of the one or more trigger elements responsive to the trigger activation information.

17. The apparatus of claim 11, wherein the processor is further configured to:
populate a device identifier field of the datagram with a trigger activation device identifier that identifies the datagram as a trigger activation datagram, wherein the datagram is generated without a command field.

18. The apparatus of claim 17, wherein the processor is further configured to:
write the trigger activation device identifier to a configuration register in each of the plurality of slave devices before transmitting the datagram over the serial bus.

19. The apparatus of claim 17, wherein the trigger activation device identifier is selected to cause the plurality of slave devices to respond to the datagram by writing trigger activation data to a register address associated with the trigger activation device identifier.

20. The apparatus of claim 11, wherein the datagram is transmitted over the serial bus in accordance with an RFFE protocol.

21. An apparatus comprising:
means for generating a datagram that does not have an address field, wherein a data payload of the datagram is populated with trigger activation information directed to a plurality of slave devices coupled to a serial bus; and
means for transmitting the datagram over the serial bus, wherein transmission of the datagram serves as a trigger that causes a configuration change in at least one slave device.

22. The apparatus of claim 21, wherein the means for generating the datagram is configured to:
provide a command field in the datagram with a trigger activation command code selected to cause the plurality of slave devices to respond to the datagram by writing trigger activation data to a register address associated with the trigger activation command code.

23. The apparatus of claim 22, wherein the means for transmitting the datagram over the serial bus is configured to:
write the trigger activation command code to a configuration register in each of the plurality of slave devices before transmitting the datagram over the serial bus,
wherein the trigger activation information is directed to one or more trigger elements in the plurality of slave devices.

24. The apparatus of claim 21, wherein the means for generating the datagram is configured to:
populate a device identifier field of the datagram with a trigger activation device identifier that identifies the datagram as a trigger activation datagram, wherein the datagram is generated without a command field.

25. The apparatus of claim 24, wherein the means for transmitting the datagram over the serial bus is configured to:
write the trigger activation device identifier to a configuration register in each of the plurality of slave devices before transmitting the datagram over the serial bus,
wherein the trigger activation device identifier is selected to cause the plurality of slave devices to respond to the datagram by writing trigger activation data to a register address associated with the trigger activation device identifier.

* * * * *